United States Patent
Lo et al.

(10) Patent No.: US 9,921,838 B2
(45) Date of Patent: Mar. 20, 2018

(54) SYSTEM AND METHOD FOR MANAGING STATIC DIVERGENCE IN A SIMD COMPUTING ARCHITECTURE

(71) Applicant: MediaTek Inc., Hsin-Chu (TW)

(72) Inventors: Chen-Kang Lo, Taipei (TW); Shih-Wei Liao, Taipei (TW); Cheng-Ting Han, Kaohsiung (TW); Dz-Ching Ju, Saratoga, CA (US)

(73) Assignee: MEDIATEK INC., Hsin-Chu (TW)

( * ) Notice: Subject to any disclaimer, the term of this patent is extended or adjusted under 35 U.S.C. 154(b) by 347 days.

(21) Appl. No.: 14/873,660

(22) Filed: Oct. 2, 2015

(65) Prior Publication Data
US 2017/0097825 A1    Apr. 6, 2017

(51) Int. Cl.
*G06F 9/30* (2006.01)
*G06F 9/38* (2018.01)
*G06F 9/45* (2006.01)

(52) U.S. Cl.
CPC ............ *G06F 9/3009* (2013.01); *G06F 8/443* (2013.01); *G06F 9/30007* (2013.01); *G06F 9/3836* (2013.01); *G06F 9/3851* (2013.01); *G06F 9/3887* (2013.01)

(58) Field of Classification Search
CPC .......... G06F 9/30; G06F 9/38; G06F 9/30007; G06F 9/30036; G06F 9/3009; G06F 9/30098
See application file for complete search history.

(56) References Cited

U.S. PATENT DOCUMENTS

| | | | |
|---|---|---|---|
| 7,617,384 B1 * | 11/2009 | Coon | G06F 9/3851 712/220 |
| 7,761,697 B1 * | 7/2010 | Coon | G06F 9/322 712/233 |
| 8,381,203 B1 * | 2/2013 | Beylin | G06F 8/458 717/149 |
| 9,645,802 B2 * | 5/2017 | Mehrara | G06F 8/45 |
| 2009/0240931 A1 * | 9/2009 | Coon | G06F 9/30054 712/234 |
| 2011/0283256 A1 * | 11/2011 | Raundahl Gregersen | G06F 8/67 717/108 |

(Continued)

OTHER PUBLICATIONS

Karrenberg, R., et al.; "Improving Performance of OpenCL on CPUs;" Compiler Construction; 2012; pp. 1-20.

(Continued)

*Primary Examiner* — Isaac T Tecklu
(74) *Attorney, Agent, or Firm* — McClure, Qualey & Rodack, LLP

(57) ABSTRACT

A method is presented for processing one or more instructions to be executed on multiple threads in a Single-Instruction-Multiple-Data (SIMD) computing system. The method includes the steps of analyzing the instructions to collect divergent threads among a plurality of thread groups of the multiple threads; obtaining a redirection array for thread-operand association adjustment among the divergent threads according to the analysis, where the redirection array is used for exchanging a first operand associated with a first divergent thread in a first thread group with a second operand associated with a second divergent thread in a second thread group; and generating compiled code corresponding to the instructions according to the redirection array.

17 Claims, 8 Drawing Sheets

(56) References Cited

U.S. PATENT DOCUMENTS

| | | | |
|---|---|---|---|
| 2013/0042090 A1* | 2/2013 | Krashinsky | G06F 9/3016 712/214 |
| 2013/0061027 A1* | 3/2013 | Chen | G06F 9/3887 712/234 |
| 2013/0305021 A1* | 11/2013 | Grover | G06F 9/3836 712/214 |
| 2014/0075165 A1* | 3/2014 | Chen | G06F 9/322 712/233 |
| 2014/0149710 A1* | 5/2014 | Rogers | G06F 9/3851 711/170 |
| 2014/0165049 A1* | 6/2014 | Diamos | G06F 8/443 717/156 |
| 2014/0244968 A1* | 8/2014 | Greyzck | G06F 15/76 712/3 |
| 2015/0026438 A1* | 1/2015 | Giroux | G06F 9/38 712/225 |
| 2015/0046684 A1* | 2/2015 | Mehrara | G06F 8/45 712/220 |
| 2015/0095914 A1* | 4/2015 | Mei | G06F 9/4843 718/102 |
| 2015/0205590 A1* | 7/2015 | Sabne | G06F 8/456 717/150 |
| 2015/0205607 A1* | 7/2015 | Lindholm | G06F 9/528 712/234 |
| 2015/0317157 A1* | 11/2015 | Gruber | G06F 9/3009 712/22 |
| 2015/0355996 A1* | 12/2015 | Smith | G06F 11/3636 717/128 |
| 2016/0019066 A1* | 1/2016 | Diamos | G06F 9/3867 712/228 |
| 2016/0092240 A1* | 3/2016 | Maiyuran | G06F 9/3887 712/234 |
| 2016/0179535 A1* | 6/2016 | Chen | G06F 9/30058 712/22 |
| 2017/0061569 A1* | 3/2017 | Sathe | G06T 1/20 |
| 2017/0235581 A1* | 8/2017 | Nickolls | G06F 9/3887 712/214 |

OTHER PUBLICATIONS

Zhang, E.Z., et al.; "On-the-Fly Elimination of Dynamic Irregularities for GPU Computing;" Mar. 2011; pp. 369-380.

\* cited by examiner

| source program | assembly code | compiled code |
|---|---|---|
| if (2<=tid && tid<=9)<br>  b[tid]= a[tid]+ 1;<br>else<br>  b[tid]= a[tid]- 1; | ~~VGTEQ id, 2, vcc~~<br>~~VLTEQ id, 9, vcc~~<br>~~CBR vcez else, vcc~~<br>ADD dst, src, 1, ~~@vcc~~<br>else:<br>NEG vcc, vcc<br>SUB dst,src, 1, ~~@vcc~~ | call data_relocate(R)<br><br>CGTEQ id, 2, cc<br>CLTEQ id, 9, cc<br>CBN else, cc<br>ADD dst, src, 1<br>else:<br>SUB dst, src, 1<br><br>call data_restore(R) |

Benefit = Num of eliminated operations = 5
-Assume predication @vcc has cost of 1

Cost = Num of produced operations + 2*Num$_{\text{data move}}$*cost$_{\text{data\_move}}$ = 3+2*4*0.1 = 3.8
-Assume cost$_{\text{data\_move}}$ = 0.1

FIG. 4

SYSTEM AND METHOD FOR MANAGING STATIC DIVERGENCE IN A SIMD COMPUTING ARCHITECTURE

BACKGROUND OF THE INVENTION

Field of the Invention

The invention relates generally to multi-thread computing, and more specifically, to a system and method for managing divergent threads in a single-instruction, multiple-data ("SIMD") architecture.

Description of the Related Art

Single instruction, multiple data (SIMD) is a parallel execution model adopted by some modern processors such as graphics processing units (GPUs), digital signal processors (DSPs), and central processing units (CPU). Such a processor can execute a single instruction through multiple threads concurrently by utilizing its parallel data paths. Single-program multiple-data (SPMD) accelerator languages such as CUDA® and OpenCL® have been developed to enhance the computing performance of processors that have the SIMD architecture.

Processors with SIMD architectures are designed to maximize the amount of parallel processing in the pipeline. In a SIMD architecture, the various threads attempt to execute program instructions synchronously as often as possible to increase computing efficiency. That is, it is desired that all threads follow a single flow of control for increasing computing efficiency.

A problem that decreases computing efficiency typically arises, however, when the program includes branches, and some threads want to execute the branch, but others do not. For example, to handle an if-else block where various threads of a processor follow different control-flow paths, the threads that follow the "else" path are disabled (waiting) when the threads that follow the "if" path are executed, and vice versa. Hence, one control-flow path is executed at a time, even though the execution is useless for some of the threads.

In some prior-art systems, all threads are dragged through each branch, regardless of whether the threads execute the instructions associated with that branch. Other prior-art systems simply disable all threads that do not execute a branch. Both designs are inefficient since hundreds of threads may be disabled while the branch is executed. A common multithreaded architecture is to allow threads to be broken into several thread groups. When a branch in a program is encountered, each thread group is able to traverse the branch independently of the other thread groups. Thus, the thread groups that do not execute a branch do not have to be disabled while the branch is being executed.

Yet, it is common for threads in a thread group to "diverge" from one another so that one or more threads may execute a branch, while others do not. Such circumstances may still be harmful to computing efficiency. Accordingly, it is desirable to devise an approach for managing thread divergences that may occur when a thread group encounters one or more branches in a program.

BRIEF SUMMARY OF THE INVENTION

A method, a non-transitory computer-readable storage medium, and a computing system are provided. The method is for processing one or more instructions to be executed on multiple threads in a Single-Instruction-Multiple-Data (SIMD) computing system. The method comprises the following actions: analyze the instructions to collect divergent threads among a plurality of thread groups of the multiple threads; obtain a redirection array for thread-operand association adjustment among the divergent threads according to the analysis, wherein the redirection array is used for exchanging a first operand associated with a first divergent thread in a first thread group with a second operand associated with a second divergent thread in a second thread group; and generate compiled code corresponding to the instructions according to the redirection array.

An exemplary embodiment of the non-transitory computer-readable medium storing therein a compiler program is provided. The compiler program when executed causes an electronic device to execute a process for processing one or more instructions to be executed on multiple threads in a Single-Instruction-Multiple-Data (SIMD) computing system. The process comprises steps to: analyze the instructions to collect divergent threads among a plurality of thread groups of the multiple threads; obtain a redirection array for thread-operand association adjustment among the divergent threads according to the analysis, wherein the redirection array is used for exchanging a first operand associated with a first divergent thread in a first thread group with a second operand associated with a second divergent thread in a second thread group; and generate compiled code corresponding to the instructions according to the redirection array.

An exemplary embodiment of the computing system comprises a plurality of registers and a processing circuit. The plurality of registers is configured for storing operands associated with the multiple threads. The processing circuit configured for: analyzing the instructions to collect divergent threads among a plurality of thread groups of the multiple threads; obtaining a redirection array for thread-operand association adjustment among the divergent threads according to the analysis, wherein the redirection array is used for exchanging a first operand associated with a first divergent thread in a first thread group with a second operand associated with a second divergent thread in a second thread group; and generating compiled code corresponding to the instructions according to the redirection array.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4 gives a cost model that evaluates cost-benefit by adopting the method of FIG. 3 according to another embodiment of the invention;

DETAILED DESCRIPTION OF THE INVENTION

Various embodiments of the invention are described with reference to the accompanying drawings in detail. The same reference numbers are used throughout the drawings to refer to the same or like components. These embodiments are made for the purpose of illustrating the general principles of the invention and should not be taken in a limiting sense. Detailed descriptions of well-known functions and structures are omitted to avoid obscuring the subject matter of the invention.

It should be noted that different references to "an" or "one" embodiment in this disclosure are not necessarily to the same embodiment, and such references mean at least one. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
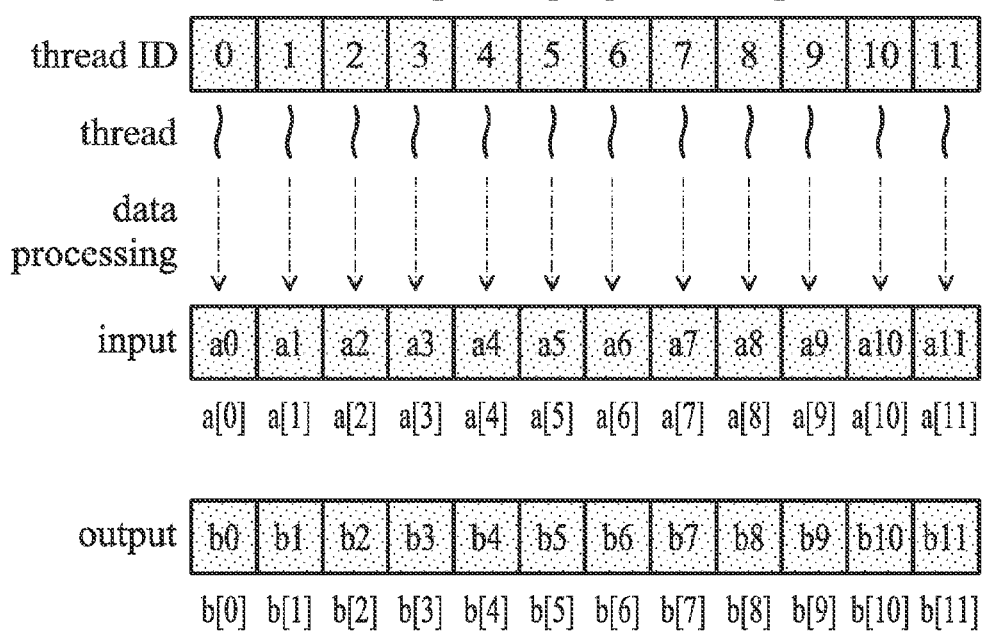
FIG. 1 shows an exemplary source program that is suitable for execution on a SIMD computing system.

FIG. 1 shows an exemplary OpenCL® program that is suitable for execution on a SIMD computing system. The program effectively performs 12 addition operations in parallel on each of the inputs (i.e. a0 through a11) to produce each of the outputs (i.e. b0 through b11), where each addition operation is carried out by a respective thread. The input and output may be physically stored in any storage medium such as flip-flops, static random access memory (SRAM), cache, flash memory and so forth (hereinafter collectively referred as register). For illustrative purposes, we use a# (# is 0, 1, . . . , or 11) to denote operands (or variables) stored in a particular register location denoted as a[#]. For example, the source operand a4 for the program is stored in a[4] while the destination operand b4 is stored in b[4].

The term "thread" can be understood as an instance of the program executing on a particular set of input to obtain a corresponding set of output (e.g. add a0 by 1 to get b0). Each thread is assigned a unique thread identifier (hereinafter referred as "thread ID") during execution of the program for manipulating various aspects of the thread's processing behavior. A thread ID may be used to determine which portion of the input data set a thread is to process and/or to determine which portion of an output data set a thread is to produce or write. For instance, the thread with thread ID being 4 is guided to (as indicated by "data processing") retrieve input from a[4] to get a4 as a source operand and produce a destination operand b4 that is to be stored in b[4].

Since each of the threads (from thread ID 0 through 11) simultaneously executes the same operations (or instructions) on its respective data sample, this type of synchronized processing is advantageous because it allows groups of like data samples to be processed concurrently so that computing efficiency is increased. As such, the threads shown in FIG. 1 can be said to be "uniform" with respect to the program.

There are, however, points in a program (i.e., branches) where threads in a thread group are allowed to "diverge" from each other so that one or more threads may execute instructions on their respective samples that do not need to be executed by the other threads in the thread group. Please refer to FIG. 2, which shows a divergent code among threads in a plurality of thread groups. By way of example, not limitation, the twelve threads are divided into three thread groups (i.e. thread group 0, thread group 1 and thread group 2). That is, there can be in general M thread groups and each thread group contains N threads, where M and N can be any positive integer. Also, in the following thread 0 refers to the thread with thread ID being 0, thread 1 refers to the thread with thread ID being 1, and so forth.

For threads in the same thread group (e.g. thread 0 through thread 3), a program counter is shared so that operations to be executed by each thread should be the same for a given clock cycle. By analyzing the code (where tid stands for thread ID) in FIG. 2, however, it can be known that both thread 0 and thread 1 would take the "else" branch of the code while thread 2 and thread 3 would take the "if" branch of the code. Likewise, both thread 8 and thread 9 would take the "if" branch while thread 10 and thread 11 would take the "else" branch. In other words, thread divergence exists among thread group 0 and thread group 2. As a result, it requires redundant operation for executing the divergent code with the branches shown: e.g., during a first clock cycle, thread 0 and thread 1 execute the "add by 1" operation (on a0 and a1 to obtain b0 and b1, respectively) with thread 2 and thread 3 disabled; during a second clock cycle, thread 2 and thread 3 execute the "subtract by 1" operation (on a2 and a3 to obtain b2 and b3, respectively) with thread 0 and thread 1 disabled.

Figure 2:
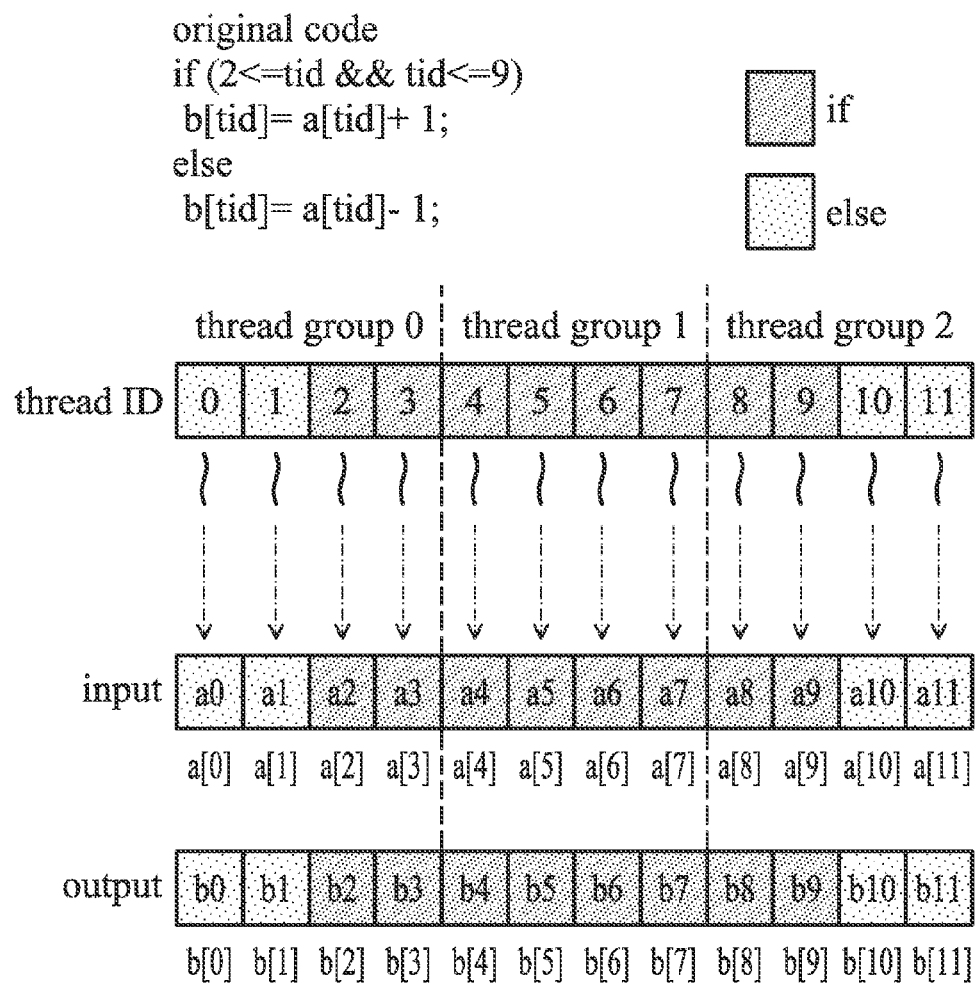
FIG. 2 shows an exemplary divergent code among threads of thread groups.

The thread divergence scenario illustrated in FIG. 2 is referred to as static divergence because such thread divergence can be detected (or tested) when compiling a source program. In contrast, dynamic divergence refers to thread divergences that cannot be known during compile-time and may be known only during run-time of a program. With the presence of divergence, some threads in a SIMD thread group may be temporarily idle, e.g., due to conditional or predicated instructions, divergence at branches in the program, or the like; and the computing efficiency of a system may be degraded since the advantages of "uniformity" cannot be utilized. Since static divergence may be detected before executing a program, it is therefore an objective of the invention to "transform" static divergence into uniformity during compile time by exploiting thread divergences among different thread groups. The generated compiled code may be divergence free or exhibit less divergence compared with assembly counterpart that is generated without the techniques disclosed in the invention.

Figure 3:
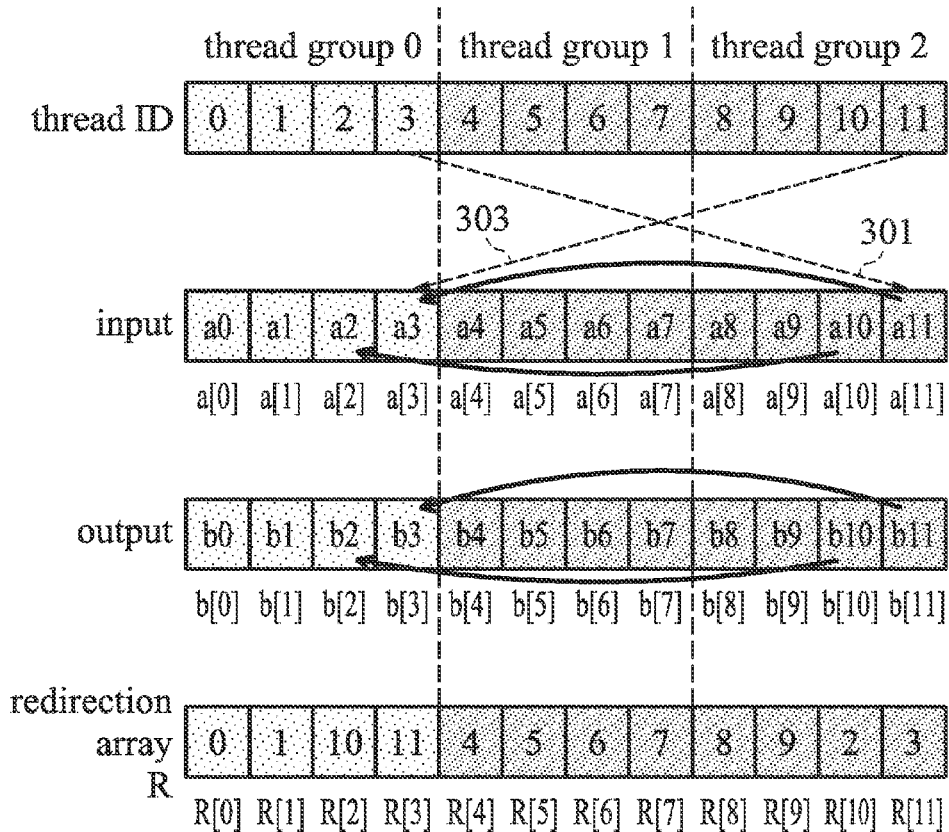
FIG. 3 illustrates a method for processing instructions to improve efficiency of an SIMD computing system according to some embodiments of the invention.

FIG. 3 illustrates a method for processing instructions to improve efficiency of an SIMD computing system by reducing static divergence among thread groups in accordance with some embodiments of the invention. Please refer to FIG. 3 in light of the descriptions in regard of FIGS. 1 and 2. As indicated previously, there exists thread divergence within thread group 0 (i.e. threads 0 through 3) and thread group 2 (i.e. threads 8 through 11). By analyzing the "original code", it can be observed that both thread 2 and thread 3 in the thread group 0 take the "if" branch while both thread 10 and thread 11 in the thread group 2 take the "else" branch. So, by way of example, thread 2 and thread 3 can be selected as divergent threads in the thread group 0 whereas thread 10 and thread 11 can be selected as divergent threads in the thread group 2. (Note that there are other ways to select divergent threads such as selecting thread 8 and thread 9 as well as thread 0 and thread 1; and the invention should not be limited thereto).

Such an analysis would suggest that static divergence in thread group 0 and thread group 2 can both be eliminated if the selected divergent threads in each thread group can be "exchanged". In other words, if thread 2 and thread 3 take the "else" branch (from thread 10 and thread 11) while the thread 10 and thread 11 take the "if" branch (from thread 2 and thread 3), then both thread group 0 (threads 0 through 3 all take the "else" branch) and thread group 2 (threads 8 through 11 all take the "if" branch) become uniform. The static divergence elimination (or at least reduction) can be achieved by exchanging the operand (i.e. a2 and/or a3) associated with the divergent threads selected from thread group 0 with the operand (i.e. a10 and/or a11) associated with the divergent threads selected from thread group 2. By exchanging the operands among the divergent threads, threads 2 and 3 can execute the operation (i.e. subtract by 1 or the "else" branch) on source operands a10 and a11 originally intended to be performed by threads 10 and 11 while threads 10 and 11 can execute the operation (i.e. add by 1 or the "if" branch) on source operands a2 and a3 originally intended to be performed by threads 2 and 3. The same can be done with respect to the destination operands b2, b3, b10, and b11. For a more specific example, thread 2 effectively performs the arithmetic operation: b[10]=a[10]−1 and thread 10 effectively performs the arithmetic operation: b[2]=a[2]+1.

There are two ways to exchange the operands among the divergent threads in different thread groups according to embodiments of the invention. A first approach is to exchange storage location of a first operand associated with a first divergent thread in a first thread group with storage location of a second operand associated with a second divergent thread in a second thread group. For example, as shown in FIG. 3, the operand a2 associated with the thread 2 in thread group 0 is moved from a[2] to a[10] and the operand a3 associated with the thread 3 in thread group 0 is moved from a[3] to a[11]. In exchange, the operand a10 associated with the thread 10 in thread group 2 is moved from a[10] to a[2] and the operand a11 associated with the thread 11 in thread group 2 is moved from a[11] to a[3].

In addition, a second approach redirects the first divergent thread (that is originally associated with the first operand) to the second operand while redirects the second divergent thread (that is originally associated with the second operand) to the first operand. For example, as shown in the dotted arrow 301, thread 3 is redirected away from a[3] to a[11]; on the contrary, as shown in the dotted arrow 303, thread 11 is redirected away from a[11] to a[3]. This means that, during the execution-time, thread 3 retrieves data from a[11] (the location where a11 is stored) and thread 11 retrieves data from a[3] (the location where a3 is stored). The advantage of this approach is that there is no need for data movement in the register space; what is adjusted is threads-operands association (which thread is associated with which operand).

Regardless of which approaches are adopted to perform thread-operand association adjustment among the divergent threads, the analysis result obtained from analyzing the "original code" may be stored as a redirection array R, which records information about how to adjust the operands associated with the divergent threads. Like the input stored in register locations a[0] through a[11], the redirection array R may comprise twelve register locations R[0] through R[11], where {0, 1, 10, 11, 4, 5, 6, 7, 8, 9, 2, 3} are respectively stored in each of the locations. For the sake of brevity, the description below is primarily related to the first approach; however, it will be appreciated that the disclosed embodiments can be easily adapted with respect to the second approach. As an example, R[2] stores 10 (and vice versa R[10] stores 2) and this can be used to suggest that a2 should be exchanged with a10 so that thread 2 takes a10 as associated operand while thread 10 takes a2 as associated operand after applying the redirection R on the "original code". Each entry of the redirection array R may be associated with each of the threads, respectively (e.g. thread 0 refers to R[0] for related operations upon code execution).

Once the redirection array R is obtained, the "compiled code" corresponding to the "original code" in FIG. 2 may be generated. Referring to FIG. 3, the "compiled code" may comprise several portions: data_relocated(R), core portion 305, and data_restore(R) (optional). First, is the "data relocate(R)", which represents applying the redirection array R on a first operand (e.g. a2 or a3) and a second operand (e.g. a10 or a11) to obtain a relocated operand configuration (as shown in input of FIG. 3) from an original operand configuration (as shown in input of FIG. 1). Then, follows the core portion 305 which dispatches, according to the redirection array R, the "original code" for execution among the threads 0 through 11. In the core portion 305, the branch condition is changed to "if (2<=R[tid]<=9)" (in contrast with 2<=tid <=9 in the "original code") so that arithmetic operations pertaining to threads 0 through 3 would be "subtract by 1" whereas arithmetic operations pertaining to threads 4 through 11 would be "add by 1".

During run-time, once the core portion 305 is executed, the desired arithmetic results are obtained with uniformity except the association among threads and operands are changed. For example, thread 2 is associated with b10 (instead of b2 before executing the "compiled code") since what is stored in b[2] is b10 after adjusting the thread-data association among the divergent threads. For some application, it might be needed that thread-operand association is restored to what it was before aforementioned adjustment. Thus, for another embodiment of the invention, the generated compiled code further comprises restoring the original operand configuration (as shown in output of FIG. 2) from the relocated operand configuration (as shown in output of FIG. 3) using the redirection array R as shown by the portion "data_restore(R)", which applies the redirection array R in an opposite way compared with "data_relocate(R)". After "data_restore(R)", for example, b10 (equals a10−1) is moved back to b[10] from b[2]; on the contrary, b2 (equals a2+1) is moved back to b[2] from b[10]. In this way, a computing system where the "compiled code" is executed generates virtually the same result as compared with when the "original code" is executed. The difference is that when executing the "compiled code", as static divergence is eliminated, computing efficiency improves as far as the computing system is concerned.

Please refer to FIG. 4 for illustration of a cost model that evaluates cost-benefit of the "compiled code" generated according to the redirection array R. Note that the codes presented serve to exemplify the run-time cost difference and some details necessary to make the codes executable are omitted so as not to obscure the focus. In FIG. 4, the "assembly code" is generated by compiling the source program without applying the redirection R. When it is found that the benefit incurred is greater than the cost incurred when switching from the "assembly code" to the "compiled code", it is justified to adopt the "compiled code" at run-time rather than the "assembly code". To put it differently, the following steps may need to be performed according to some embodiments of the invention. Firstly, estimating through a cost model whether the run-time cost of the "compiled code" is lower than the run-time cost of the "assembly code". Secondly, adopting the "compiled code" rather than the "assembly code" at run-time when it is determined that the run-time cost of the "compiled code" is lower than that of the "assembly code".

The cost model may at least consider two factors: the benefit of eliminated operations and cost of added operand moves (resulted from applying the redirection array R). Referring to FIG. 4, by adopting the "compiled code", the predicated instructions in the "assembly code" (those ended with ", vcc") can be removed because of the elimination of static divergence in the threads. The predicated operations are utilized to tackle thread divergence. In a nutshell, the "VGTEQ id, 2, vcc" and "VLTEQ id, 9, vcc" serve to set the vcc associated with the threads with thread ID greater than 2 and smaller than 9 to 1; and the "CBR_vccz else, vcc" is a conditional branch based on the vcc. For example, the vcc has 4 bits vcc[0] through vcc[3] and each bit is associated with threads 0 through 3. Once "VGTEQ id, 2, vcc" and "VLTEQ id, 9, vcc" are executed, the vcc would be set to 4'b0011 (i.e. vcc[0]=0, vcc[1]=0, vcc[2]=1, vcc[3]=1); then the conditional branch "CBR_vccz else, vcc" would enable thread 2 and thread 3 for executing the instruction "ADD dst, src, 1@vcc" while disable thread 0 and thread 1. On the contrary, when executing the instruction "SUB dst, src, 1@vcc", thread 0 and thread 1 would be enabled while thread 2 and thread 3 are disabled.

If the "compiled code" is adopted, the strike-through 5 predicated instructions can be replaced by 3 non-predicated instructions ("CGTEQ id, 2, cc", "CLTEQ id, 9, cc", and "CBN else, cc") since no divergence is present. In contrast to "vcc", "cc" is a scalar instead of a vector because all threads in a thread group either all execute "ADD dst, src, 1" or execute "SUB dst, src, 1". What is added in the "compiled code" is the "data relocate(R)" and "data restore (R)" instruction. Suppose, during run-time, each of the predicated or the non-predicated has a unit cost and each data movement has a cost of 0.1; then, the benefit of adopting the "compiled code" would be 5 (5 predicated instructions removed) and the corresponding cost would be 3 (three non-predicated instructions added)+2*4*0.1 (data movement on b2, b3, b10 and b11 performed twice)=3.8, which is smaller than the benefit incurred. Thus, for this example, it is determined to adopt the "compiled code" instead of the "assembly code" during program execution.

Figure 5:
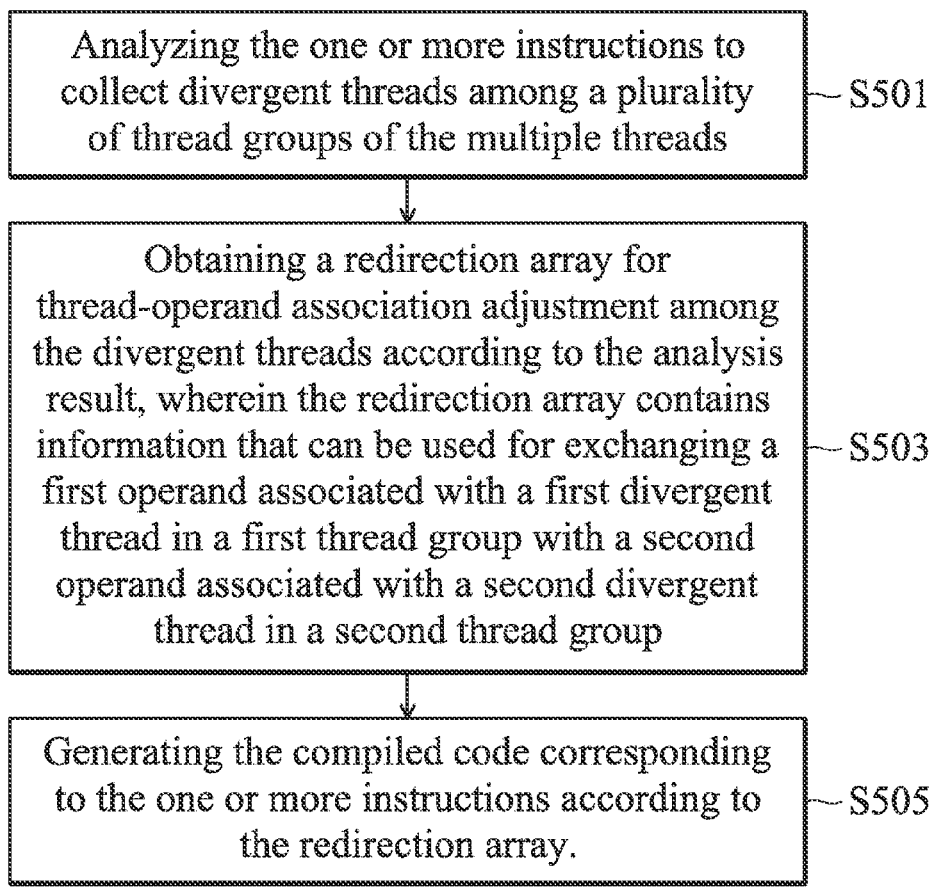
FIG. 5 is a flow chart illustrating a method for processing one or more instructions to be executed on multiple threads in a SIMD computing system according to some other embodiment of the invention.

FIG. 5 is a flow chart illustrating a method for processing one or more instructions to be executed on multiple threads in a SIMD computing system according to an embodiment of the invention. The method can be used to generate compiled code that exhibits better run-time efficiency. In step S501, the instructions are analyzed for collecting divergent threads among a plurality of thread groups of the multiple threads. In step S503, a redirection array is obtained for thread-operand association adjustment among the divergent threads according to the analysis result. The redirection array contains information that can be used for (at least) exchanging a first operand associated with a first divergent thread in a first thread group with a second operand associated with a second divergent thread in a second thread group. In step S505, the compiled code corresponding to the instructions is generated according to the redirection array.

Figure 6:
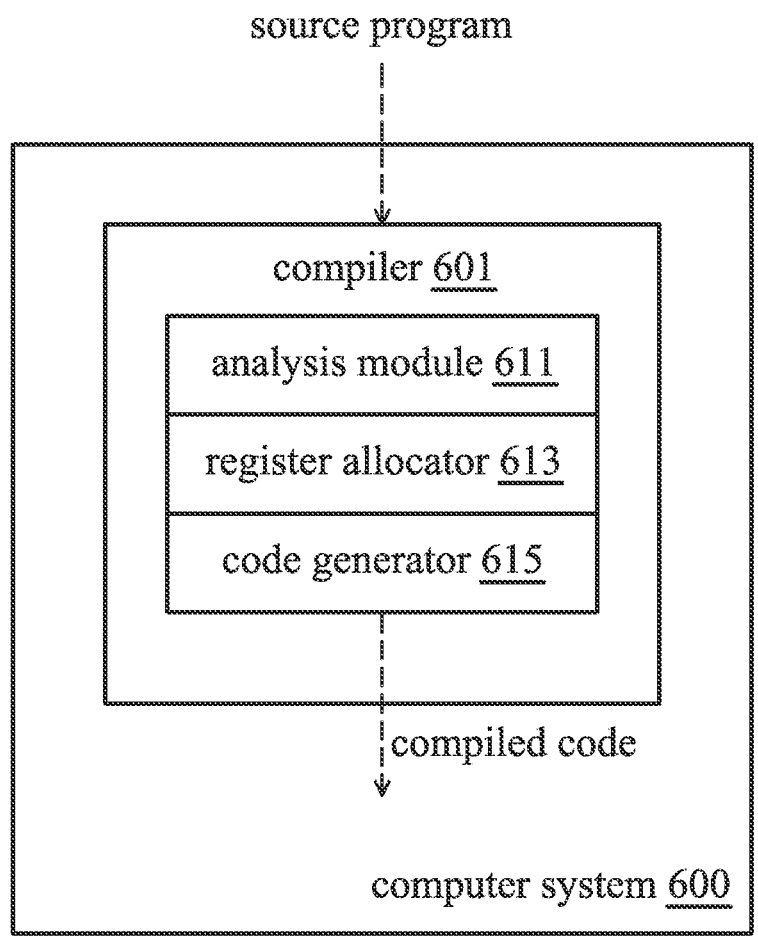
FIG. 6 illustrates a compiler for performing the flow chart illustrated in FIG. 5.

The flow chart of FIG. 5 may be executed by a compiler, such as the compiler 601 of FIG. 6 according to one embodiment of the invention. The compiler 601 runs on a computer system 600. The compiler 601 includes an analysis module 611 to perform analysis, e.g., static analysis, on an instruction sequence (such as the source program of FIG. 4) to collect divergent threads among thread groups of the multiple threads and obtain the redirection array for compiled code generation. The compiler 601 further includes a register allocator 613 and a code generator 615. When the analysis module 611 finishes the analysis on the instruction sequence, the register allocator 613 allocates registers to source and destination operands (e.g. b0 through b11) for each instruction, and the code generator module 615 generates executable machine code (such as the compiled code of FIG. 4) according to the redirection array.

Figure 7:
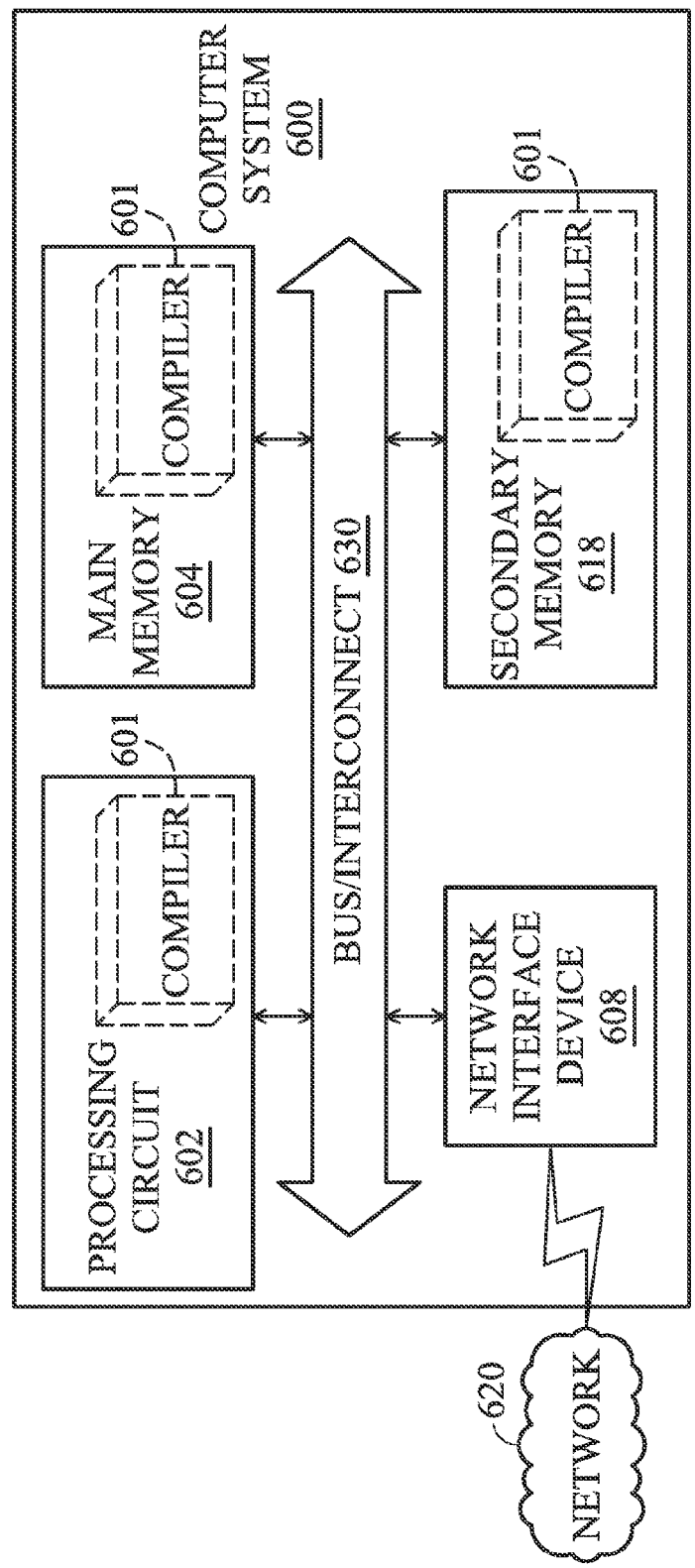
FIG. 7 is a block diagram illustrating a computer system according to one embodiment of the invention.

FIG. 7 illustrates a diagrammatic representation of a machine in the exemplary form of the computer system 600 (disclosed in FIG. 6) within which a set of instructions, for causing the machine to perform any one or more of the methodologies discussed herein, may be executed. While only a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processing circuit 602. The processing circuit 602 represents one or more general-purpose processors, and may also include one or more special-purpose processing devices. In one embodiment, the processing circuit 602 is adapted or operative to perform the method 500 of FIG. 5 (e.g. by running the compiler 601).

In one embodiment, the processing circuit 602 is coupled to one or more memory devices such as: a main memory 604 (e.g., read-only memory (ROM), flash memory, dynamic random access memory (DRAM), etc.), a secondary memory 618 (e.g., a magnetic data storage device, an optical magnetic data storage device, etc.), and other forms of computer-readable media, which communicate with each other via a bus or interconnect 630. The memory devices may also include different forms of read-only memories (ROMs), different forms of random access memories (RAMs), static random access memory (SRAM), or any type of media suitable for storing electronic instructions. In one embodiment, the memory devices may store the code and data of the compiler 601, which may be located in one or more of the locations shown as dotted boxes and labeled by the reference numeral 601. In alternative embodiments the compiler 601 may be located in other location(s) not shown in FIG. 7.

The computer system 600 may further include a network interface device 608. A part or all of the data and code of the compiler 601 may be transmitted or received over a network 620 via the network interface device 608.

In one embodiment, the computer system 600 store and transmit (internally and/or with other electronic devices over a network) code (composed of software instructions) and data using computer-readable media (also referred to as a machine-readable medium, a processor-readable medium, or a computer usable medium having a computer readable program code embodied therein), such as non-transitory tangible computer-readable media (e.g., magnetic, optical, or electrical storage medium including a diskette, compact disk read only memory (CD-ROM), digital versatile disc read only memory (DVD-ROM) device, flash memory, or similar volatile or non-volatile storage mechanism) and transitory computer-readable transmission media (e.g., electrical, optical, acoustical or other form of propagated signals—such as carrier waves, infrared signals). In one embodiment, a non-transitory computer-readable medium stores instructions of the compiler 601 for execution on one or more processors of the computer system 600.

Figure 8:
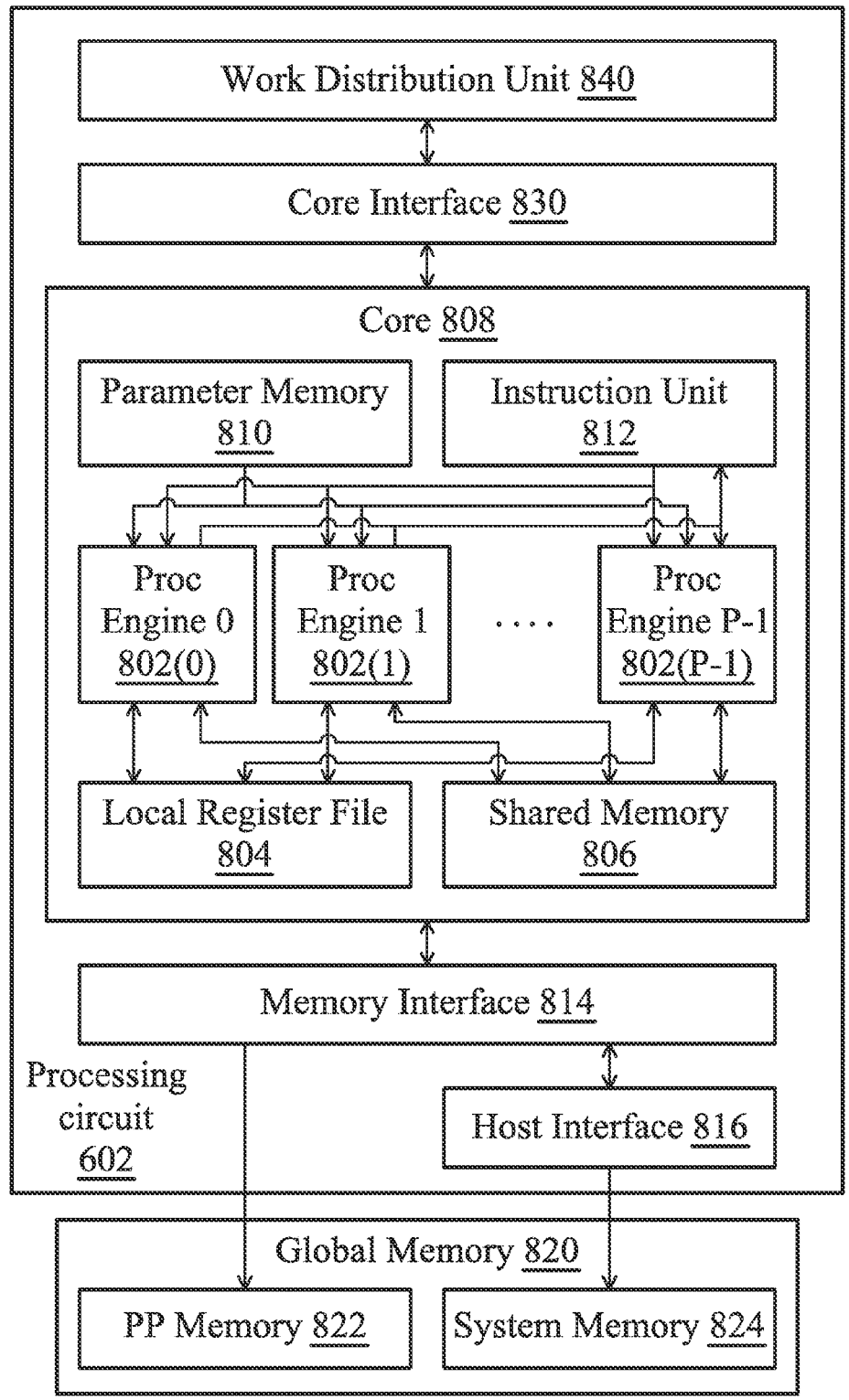
FIG. 8 is a block diagram illustrating a processing circuit suitable for executing a multi-threaded program.

FIG. 8 is an exemplary block diagram of the processing circuit 602 that is suitable for executing the aforementioned "compiled code". The processing circuit 602 includes a core 808 (or multiple cores 808) configured to execute a large number of threads in parallel. In one embodiment, each core 808 includes an array of P (e.g., 8, 16, etc) parallel processing engines 802 configured to receive SIMD instructions from an instruction unit 812. Each processing engine 802 advantageously includes an identical set of functional units (e.g. arithmetic logic units). The functional units may be pipelined, allowing a new instruction to be issued before a previous instruction has finished, as is known in the art. The functional units may support a variety of operations including integer and floating point arithmetic, comparison operations, Boolean operations, bit-shifting, etc.

Each processing engine 802 uses space in a local register file 804 for storing its local input data, intermediate results, and the like. In one embodiment, local register file 804 is physically or logically divided into P lanes, each having some number of entries. One lane is assigned to each processing engine 802, and corresponding entries in different lanes can be populated with data for different threads executing the same program to facilitate SIMD execution.

Each processing engine 802 also has access to an on-chip shared memory 806 that is shared among all of the processing engines 802 in core 808. Shared memory 806 may be as large as desired so that any processing engine 802 may read from or write to any location of the shared memory 806 with low latency. In addition to shared memory 806, some embodiments also provide additional on-chip parameter memory 810 (such as cache) to hold state parameters and/or other data (e.g., various constants) that may be needed by multiple threads. Processing engine 802 also have access via memory interface 814 to off-chip "global" memory 820, which can include, PP memory 822 and system memory 824, with system memory 824 being accessible by memory interface 814 via host interface 816.

In one embodiment, each processing engine 802 is multi-threaded and can execute up to some number G (e.g. 24) of threads concurrently. With P processing engines 802, the core 808 can have up to P*G threads executing concurrently. When instruction unit 812 is configured to issue instructions to all P processing engines 802, the core 808 can be used to process instructions with thread groups. As used herein, each thread group refers to a group of P threads of execution of the same program on different input data, with one thread of the thread group being assigned to each processing engine 808 (so there are up to G thread groups). On each clock cycle, one instruction is issued to all P threads making up a selected one of the G SIMD thread group. To indicate which thread is currently active, an "active mask" (analogous to the "vcc" of FIG. 4) for the associated threads may be set accordingly. Thus, in a given cycle, all processing engine 802 in core 808 nominally executes the same instruction for different threads in the same thread group. With the method disclosed pertinent to FIGS. 1 through 5, the "active mask" may no longer be needed because of uniformity among threads in a thread group so that the computing efficiency of the processing circuit 602 is enhanced.

Operation of core 808 may be controlled via a core interface 830. The core interface 830 receives data to be processed as well as state parameters and commands defining how data is to be processed from a work distribution unit 840. Core interface 830 can load data to be processed into shared memory 806, and parameters into parameter memory 810. Core interface 830 also initializes each new thread or thread group in instruction unit 812, then signals instruction unit 812 to begin executing the threads. When execution of a thread or thread group is completed, core 808 notifies core interface 830. Then, the core interface 830 can initiate other processes, e.g., to retrieve output data from shared memory 806 and/or to prepare core 808 for execution of additional threads or thread groups.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for processing one or more instructions to be executed on multiple threads in a Single-Instruction-Multiple-Data (SIMD) computing system, the method comprising:

analyzing the one or more instructions to collect divergent threads among a plurality of thread groups of the multiple threads;

obtaining a redirection array for thread-operand association adjustment among the divergent threads according to the analysis, wherein the redirection array is used for exchanging a first operand associated with a first divergent thread in a first thread group with a second operand associated with a second divergent thread in a second thread group; and generating compiled code corresponding to the one or more instructions according to the redirection array, wherein the redirection array is used for relocating the first operand to a second SIMD register associated with the second divergent thread, and relocating the second operand to a first SIMD register associated with the first divergent thread.

2. The method of claim 1, wherein the redirection array is used for redirecting the first divergent thread to the second operand, and redirecting the second divergent thread to the first operand.

3. The method of claim 1, wherein generating compiled code comprises:

applying the redirection array on the first operand and the second operand to obtain a relocated operand configuration from an original operand configuration; and dispatching, according to the redirection array, the one or more instructions for execution among the multiple threads.

4. The method of claim 3, wherein generating compiled code further comprises:

restoring the original operand configuration from the relocated operand configuration using the redirection array.

5. The method of claim 1, further comprising:

estimating, through a cost model, whether a first run-time cost of the compiled code is lower than a second run-time cost of an assembly code compiled without the redirection array; and adopting the compiled code rather than the assembly code if the first run-time cost is lower than the second run-time cost.

6. The method of claim 5, wherein the cost model takes benefit of eliminated operations and cost of added operand moves resulted from adopting the compiled code rather than the assembly code into consideration.

7. The method of claim 1, wherein threads in a thread group share one program counter for executing the one or more instructions.

8. The method of claim 1, wherein the first thread group and the second thread group are uniform with respect to the compiled code.

9. A non-transitory computer-readable storage medium storing therein a compiler program, the compiler program causing an electronic device to execute a process for processing one or more instructions to be executed on multiple threads in a Single-Instruction-Multiple-Data (SIMD) computing system, the process comprising:
   analyzing the one or more instructions to collect divergent threads among a plurality of thread groups of the multiple threads;
   obtaining a redirection array for thread-operand association adjustment among the divergent threads according to the analysis, wherein the redirection array is used for exchanging a first operand associated with a first divergent thread in a first thread group with a second operand associated with a second divergent thread in a second thread group; and
   generating compiled code corresponding to the one or more instructions according to the redirection array,
   wherein the redirection array is used for relocating the first operand to a second SIMD register associated with the second divergent thread, and relocating the second operand to a first SIMD register associated with the first divergent thread.

10. A computing system configured for processing one or more instructions to be executed on multiple threads, the computing system comprising:
    a plurality of registers configured for storing operands associated with the multiple threads;
    a processing circuit configured for:
    analyzing the one or more instructions to collect divergent threads among a plurality of thread groups of the multiple threads;
    obtaining a redirection array for thread-operand association adjustment among the divergent threads according to the analysis, wherein the redirection array is used for exchanging a first operand associated with a first divergent thread in a first thread group with a second operand associated with a second divergent thread in a second thread group; and
    generating compiled code corresponding to the one or more instructions according to the redirection array,
    wherein the redirection array is used for relocating the first operand to a second SIMD register associated with the second divergent thread, and relocating the second operand to a first SIMD register associated with the first divergent thread.

11. The computing system of claim 10, wherein the redirection array is used for redirecting the first divergent thread to the second operand, and redirecting the second divergent thread to the first operand.

12. The computing system of claim 10, wherein the processing circuit is configured for generating compiled code by:
    applying the redirection array on the first operand and the second operand to obtain a relocated operand configuration from an original operand configuration; and
    dispatching, according to the redirection array, the one or more instructions for execution among the multiple threads.

13. The computing system of claim 12, wherein the processing circuit is configured for generating compiled code by further:
    restoring the original operand configuration from the relocated operand configuration using the redirection array.

14. The computing system of claim 10, wherein the processing circuit is further configured for:
    estimating, through a cost model, whether a first run-time cost of the compiled code is lower than a second run-time cost of an assembly code compiled without the redirection array; and
    adopting the compiled code rather than the assembly code if the first run-time cost is lower than the second run-time cost.

15. The computing system of claim 14, wherein the cost model takes benefit of eliminated operations and cost of added operand moves when adopting the compiled code rather than the assembly code during run-time into consideration.

16. The computing system of claim 10, wherein threads in a thread group share one program counter for executing the one or more instructions.

17. The computing system of claim 10, wherein the first thread group and the second thread group are uniform with respect to the compiled code.

\* \* \* \* \*